United States Patent [19]

Collins

[11] Patent Number: 4,672,450
[45] Date of Patent: Jun. 9, 1987

[54] COMPOSITE VIDEO SYNCHRONIZATION PULSE SEPARATOR FOR COLOR IMAGE PROCESSOR

[75] Inventor: Galen Collins, San Jose, Calif.
[73] Assignee: Benson, Inc., Mountain View, Calif.
[21] Appl. No.: 721,517
[22] Filed: Apr. 9, 1985
[51] Int. Cl.⁴ ............................................. H04N 5/08
[52] U.S. Cl. ...................................... 358/153; 358/34; 358/155
[58] Field of Search ...................... 358/34, 75, 80, 29, 358/78, 79, 153, 154, 155, 156, 157

[56] References Cited

U.S. PATENT DOCUMENTS

| | | | |
|---|---|---|---|
| 3,699,256 | 10/1972 | Roth | 358/153 |
| 4,064,541 | 12/1977 | Schneider et al. | 358/153 |
| 4,084,187 | 4/1978 | Schlotzhauer et al. | 358/153 |
| 4,254,435 | 3/1981 | Dayton et al. | 358/153 |

FOREIGN PATENT DOCUMENTS

58-205378  11/1983  Japan .................................. 358/153

Primary Examiner—Michael A. Masinick
Assistant Examiner—Robert M. Bauer
Attorney, Agent, or Firm—Theodore S. Park; Bruce D. Riter; Robert C. Colwell

[57] ABSTRACT

An image processing system includes a synchronization separator 20 which operates to separate the synchronization pulses from the analog video information supplied. The separator includes an amplifier with a pair of input terminals. The video is coupled to one of the input terminals and a feedback loop coupled between an output terminal and the other input terminal. In this manner the negative synchronization pulses may be amplified while the positive video signals are limited. The extracted sync signal is used to control an analog-to-digital converter 70. The analog video information is then converted to digital form by an analog-to-digital converter. The converter operates under control of a time base generator 100, including a programmable delay line 300, which receives synchronization pulses from the synchronization separator, and following a programmable time delay supplies a control pulse to the converter to cause it to sample the analog waveform and convert it to digital format.

19 Claims, 6 Drawing Figures

COMPOSITE VIDEO SYNCHRONIZATION PULSE SEPARATOR FOR COLOR IMAGE PROCESSOR

BACKGROUND OF THE INVENTION

1. Field of the Invention

This invention relates to image processing, particularly to the processing of color images displayed on a cathode ray tube for reproduction by a color plotter or color printer. The invention also relates to an improved circuit in color image processing systems for separating synchronization signals from composite video input signals and for generating accurate timing signals. Furthermore, the invention relates to an improved method for processing color images acquired by such a system to enable their more realistic reproduction by a plotter.

2. Description of the Prior Art

As is well known in computer graphics, a series of graphics display terminals may be connected through graphics controllers to a channel controller. The channel controller in turn is coupled to a host central processing unit. The channel controller enables the host central processing unit to be connected to the individual graphics controllers associated with the various display terminals. In this manner, commands entered on the graphics display terminal are processed by the controllers and supplied through the channel controller to the host CPU in accordance with protocols determined by the host CPU. In one type of image processing system of the prior art, when a hard copy of an image displayed on a graphics display terminal was desired, special software in the host CPU was used to control driver circuits channel adapters, and rasterizing controllers, all of which in turn drove a plotter. The system required a large number of expensive components and was generally cumbersome. In addition, it operated relatively slowly and provided images substantially inferior to those obtainable using photographic equipment.

Prior art systems for acquiring hard copies of color images displayed on video monitors divide themselves into several categories. One technique, rather than creating the image on the screen, or in random access memory for controlling the screen, uses suitable software to reproduce the information in another random access memory. This allows use of the information by the host CPU to drive the plotter directly. Unfortunately, because of the vast number of different types and configurations of systems, such an approach is highly hardware-dependent, requiring emulation of the system hardware by software in the host CPU before transmitting the image to the plotter. Furthermore, such an approach requires considerable time to produce each image, often a half hour or more.

Another technique of providing hard copies, particularly suited to video complying with RS170 standard such as television monitors and 512-line interlaced displays, is the use of dry silver processes, for example, using equipment manufactured by Tektronics. Such equipment, functioning primarily as analog equipment, effectively copied the contents of the scan lines onto dry silver paper. Such systems are substantially limited, however, by their inability to render grey tones and their resolution. Furthermore, such systems are unable to process video information at a sufficiently high speed and are not suited to color reproduction.

Another technology was to display the video on the inside of a film printer box, then copy it photographically using film. A spinning color wheel was employed to provide color reproduction.

Yet another prior art approach is the Seiko D scan approach. In this system the video is digitized into a frame buffer, then sent to a plotter for reproduction. Only one bit per pixel is digitized and that bit is not further processed before driving the plotter. As a result the image is not half-toned.

In synchronization separators used in video image processors of the prior art, numerous stages are typically employed to separate the synchronization pulses from the video information. Each of these stages introduces an additional undesirable delay into the signal processing and skews the system timing. Such synchronization circuits typically did not employ feedback to lock onto the synchronization pulse and separate it from the composite video.

SUMMARY OF THE INVENTION

The color image processing system we have invented provides substantial enhancements in the quality of images produced on a plotter from composite video information used to drive a monitor. The color image processing system includes an improved synchronization separation circuit which enables separation of video information from timing information in composite video signals at a faster rate than prior art systems. The separation system delays the video signal only a few nanoseconds by processing it through a minimal number of components. The sync separation system includes a video amplifier which is used to amplify both the synchronization pulses and the video signal itself. By amplifying the synchronization pulses sufficiently, they may be used to drive downstream TTL circuitry at the same time the video portion of the signal is eliminated by the limiting of the amplifier. The separator also includes a restoration circuit to restore the level of the synchronization pulse to an appropriate DC potential.

DETAILED DESCRIPTION OF THE PREFERRED EMBODIMENTS

Overall System Configuration

Figure 1:
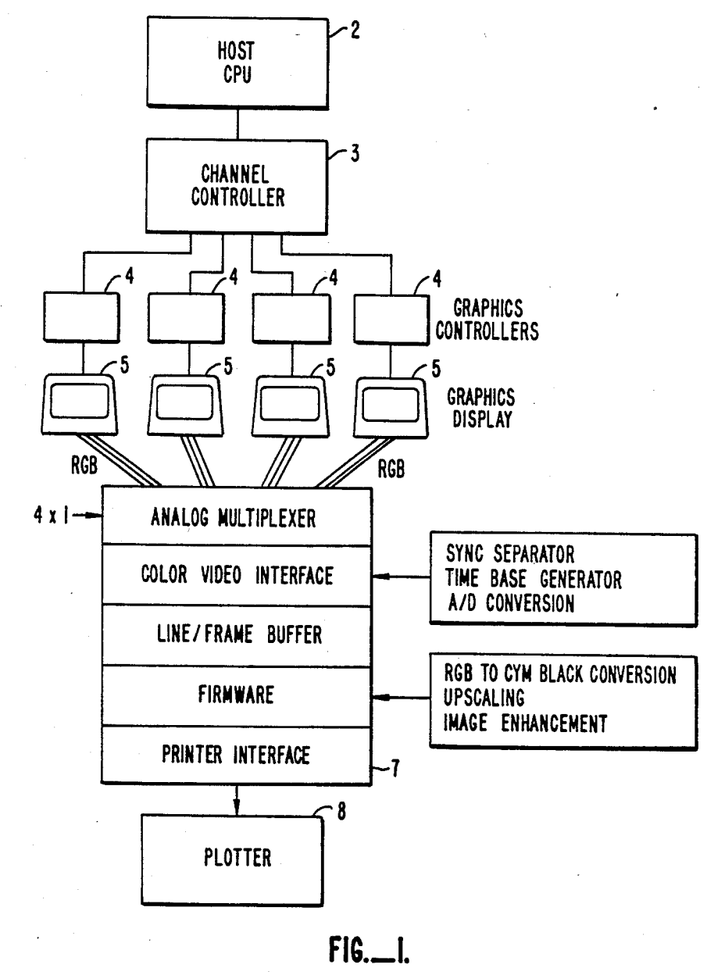
FIG. 1 is a diagram of a preferred embodiment of the color image processor of this invention.

FIG. 1 depicts an overall computer graphics system configuration which includes a preferred embodiment of the color image processing system of this invention. Generally, the color image processing system is depicted within block 7. The system depicted in FIG. 1 includes a series of graphics display terminals 5 coupled to graphics controllers 4. The graphics controllers in turn are connected through a channel controller to a host central processing unit 2. In operation an input signal from a keyboard included in the graphics display terminal will cause the channel controller, at an appropriate time, to switch the CPU's attention to that terminal 5. The data from the terminal may then be processed, and under control of CPU 2 returned via the channel controller 3 for display. One function of the color image processor of this invention is to interconnect a plotter or printer 8 with a graphics display terminal 5 without need of additional software or hardware in the channel controller or host CPU. This enables a user of one of the graphics display terminals to produce a hard copy of what is displayed on the screen of the display 5 without being required to have specialized knowledge of the hardware or software configuration of the system and without switching the CPU from whatever task it is performing.

The color image processor 7 is coupled to the graphics display terminals via well known red, green, and blue video cables. These cables carry both the video information and the synchronization information for display of the images on the cathode ray tube based terminals 5. (Systems in which separate sync and video cables are used can also be employed.) Although the image processor is explained in much greater detail below, once the particular graphics display 5 has been selected which displays an image to be plotted by plotter 8, an analog multiplexer in color processor 7 switches to an appropriate one of the red, green, and blue input lines. This signal is supplied to a color video interface in which the synchronization signals are separated from the video information and the analog video information digitized for subsequent processing. The information is digitized by a flash analog-to-digital converter operating under control of a time base generator. The digital information is stored in a line or frame buffer and then further processed by system firmware. The system firmware converts the digitized red, green, blue video information suitable for a monitor to cyan, yellow, magenta and black information suitable for a plotter. The data is then supplied to a printer interface which controls the plotter or printer 8, for example, a Benson Colorscan color ink jet plotter, to cause it to produce the selected image. Accompanying this application is a color drawing made by a prior art system and a color drawing produced by the Benson plotter 8 using a preferred embodiment of this invention.

System Block Diagram

Figure 2:
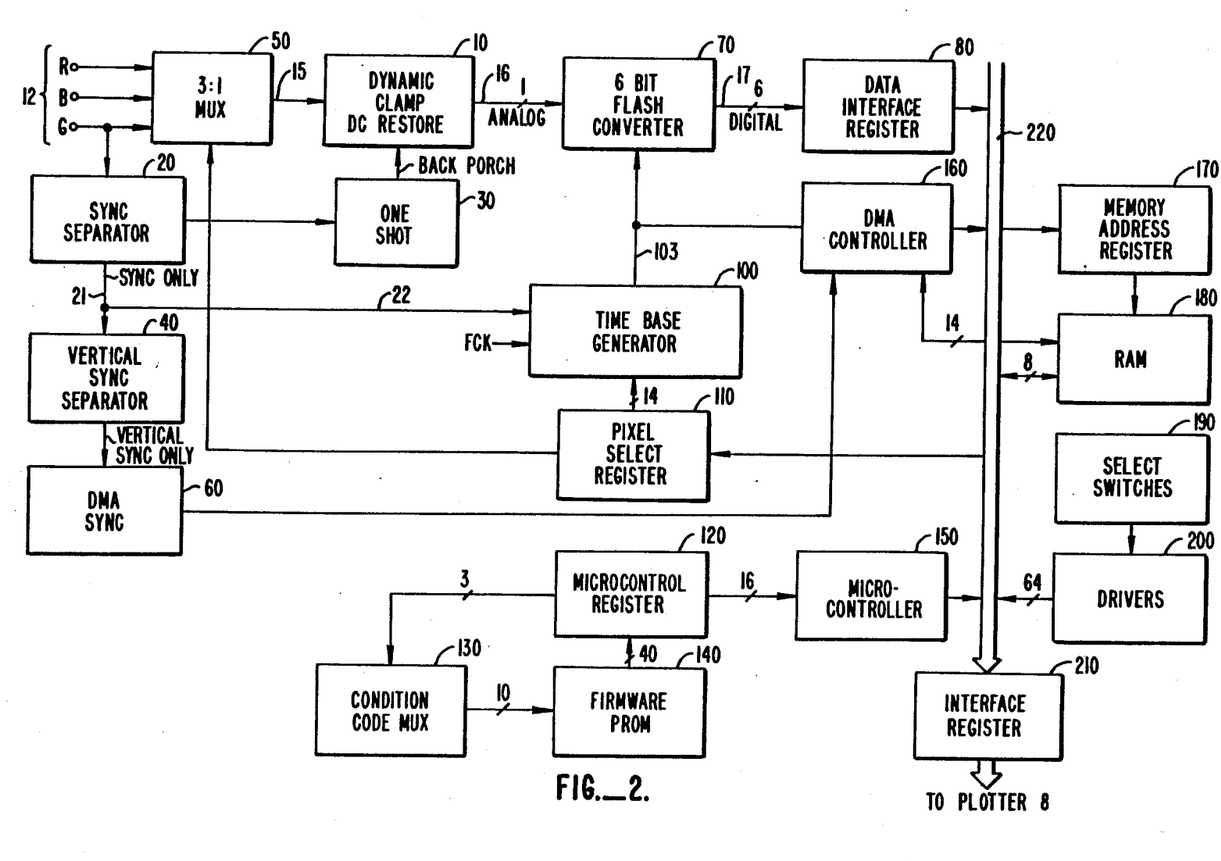
FIG. 2 is a block diagram illustrating in further detail the block 7 shown in FIG. 1.

FIG. 2 is a block diagram of a preferred embodiment of the overall color image processing system. Generally the system of FIG. 2 accepts as input, signals directed to a color monitor, and supplies as output, signals to drive a color plotter or color printer. The system depicted permits substantial improvement in the quality of images made by conventional color plotters. In the course of processing the red, blue and green input signals supplied to the monitor, the system of FIG. 2 converts them into signals suitable for controlling the cyan, magenta, yellow and black ink pens of a color ink jet plotter.

The system shown in FIG. 2 includes several unique components. The sync separator 20 processes video input signals at a substantially faster rate than separators of the prior art. In conventional image display systems, the life of a pixel is on the order of 13 nsec. The accuracy of the sync separator 20 is on the order of 2 nsec to assure that each pixel is sampled for conversion into digital signals to drive the plotter at very near the middle of that pixel, rather than along its edges. If the edges of the pixel are sampled, errors are created.

A second unique feature of the system is time base generator 100. Time base generator 100 controls the intervals at which the flash converter 70 digitizes the analog video signal supplied on line 16. The time base generator supplies precisely correlated timing signals to cause the converter to sample the video waveform at appropriate intervals.

The red, blue and green signals supplied to the input terminals 12 of the circuitry of FIG. 2 typically will conform to RS343 standards. Once received, a 3-to-1 multiplexer 50 under control of two bits in the pixel select register 110, selects one of the RGB channels for further processing. The contents of the register 110 are determined by the microcontroller 150. The signal channel from multiplexer 50 is first supplied to a dynamic clamp and DC restore circuit 10. This circuit allows the video input signal to be located within a wide range of DC voltage levels, and relocates the video at a desired DC level, typically with black as 0 volts DC. In this manner a black input signal on the selected channel 12 will result in an output voltage of 0 volts DC on line 16.

Following clamping, the video signals are supplied on line 16 to a 6-bit flash converter 70, which in the preferred embodiment is manufactured by TRW as Part No. TDC1029. (A well known sample-and-hold circuit coupled to a suitably fast analog-to-digital converter could also be employed in place of flash converter 70.) The flash converter was selected because the A-to-D conversion must be performed at high speeds and with narrow aperture. In the preferred embodiment the flash converter samples at 62 kHz or 1.34 MHz (if a buffer memory is employed) and has aperture accuracy comparable to the video signal. The time at which the converter samples and digitizes the analog input signal on line 16 is controlled by signals from the time base generator 100 on line 103. The digitized sample is then supplied to a data interface register 80 over line 17 for transfer to bus 220. In this manner the converter may proceed with the next conversion while the register 80 transfers the previous conversion onto the bus 220.

The system shown in FIG. 2 scans the image displayed on the color monitor vertically rather than horizontally. Thus, the next analog signal supplied to the converter over line 16 will be for a pixel vertically offset from the previous pixel. The scan is repeated until all pixels in a vertical region on the screen are digitized and stored before the next adjoining vertical region is scanned, digitized and stored. Vertical scanning is employed to eliminate need for a buffer memory, and still correspond to the speed of the plotter. If higher speeds are desired, a buffer memory may be employed and many scans taken vertically at desired intervals across the image. The pattern is repeated as many times as necessary, each time offset a specified number of columns from the preceding scan.

The DMA controller 160 stores the digital information directly into random access memory 180 using addresses supplied from memory address register 170 under the control of microcontroller 150. Once an entire vertical line has been stored in RAM 180, microcontroller 150 may begin processing that line in a manner which will be described below.

The timing of the analog-to-digital conversion is ultimately controlled by sync separator 20, which receives mixed synchronization and video signals from the green video input line 12, then separates out the video signals, and supplies both the horizontal and vertical sync signals on line 21 to the vertical sync separator 40, as well as to the time base generator 100. Vertical sync separator 40 separates the vertical from the horizontal synchronization pulses and supplies the vertical pulses to DMA synchronization circuit 60. These vertical pulses are used by synchronization circuit 60 to control DMA controller 160, in effect informing the controller 160 of the beginning of each vertical scan to enable storage of that data appropriately.

Sync separator 20 also drives a one-shot 30 which, in turn, generates a "back porch" timing signal for dynamic clamp and DC restore circuit 10. The back porch portion of the video input signal is a flat portion immediately following the sync pulse, but prior to the onset of the video information. (See FIG. 3.) During this period the video signal is known to be black, or if set-up is employed, to be offset a specified amount below black. The back porch timing signal from one-shot 30 enables the clamp 10 to clamp the appropriate portion (the back porch) of the analog signal 12 to 0 volts.

At the same time the sync separator 20 supplies a signal to one-shot 30, it also supplies a signal to the time base generator 100. In response, time base generator 100 provides a delayed, but highly accurately timed, pulse to the flash converter 70 to control the time at which the analog-to-digital converter 70 samples the incoming analog signal. Following receiving the edge on line 22, with a delay determined by the contents of the pixel select register 110 (except for the bits in register 110 which control multiplexer 50), the time base generator will generate an edge. In the preferred embodiment the edge has accuracy of ±2 nsec and when supplied on line 103, indicates the particular pixel to be sampled. The time base generator is a totally digital circuit having an accuracy determined by the partucular accuracy of a quartz crystal. Most importantly, the accuracy of the signal supplied by the time base generator 100 is independent of the time delay requested by the contents of the select register 110.

A series of switches, typically DIP switches, are connected through drivers 200 to bus 220. This allows user selection of pixel phasing and starting pixel position. In addition, the switches allow control over the format of the data output and the enablement or disablement of various image enhancement features described below. The microcontroller 150 detects the positions of switches 190 and in response provides the appropriate features.

The memory address register 170 stores the address of the next location in random access memory 180 which is to be accessed by the microcontroller 150. This allows the use of a microcontroller with a more limited word width than might otherwise be desirable.

The overall system is controlled by a microcontroller 150, in the preferred embodiment AMD bipolar Part No. 29116. One or more PROMs store the image processing software. A microcontrol register 120 receives words from the system's firmware stored in PROMs 140. This improves the bandwidth (speed) of the firmware PROM-microcontroller combination. A condition code multiplexer 130 controls the loading of data from PROMs 140 to register 120. Once the data is processed in the manner determined by the firmware, it is supplied to an interface register 210 for use by a plotter.

Time Base Generator Signal Timing

Figure 3:
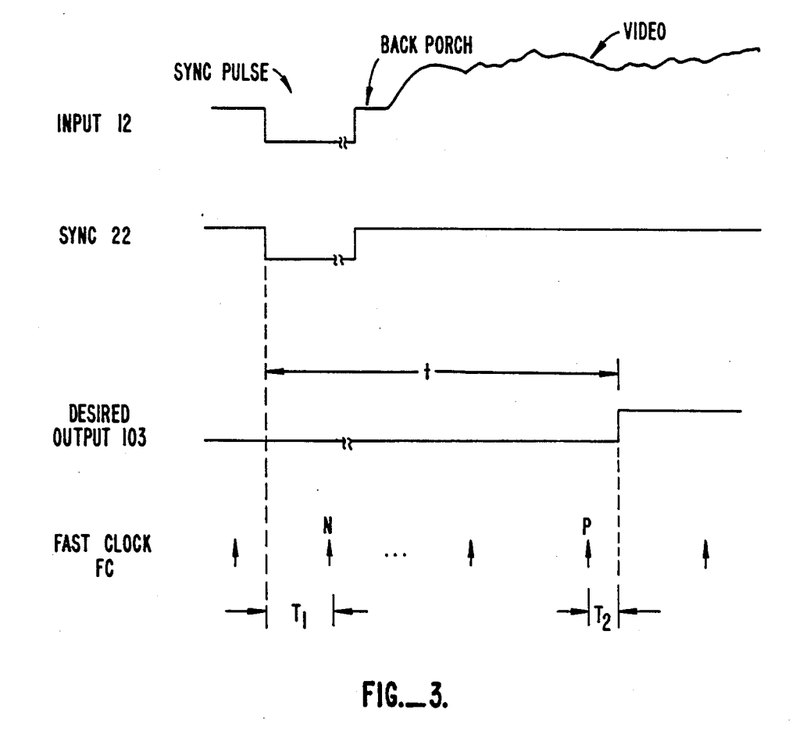
FIG. 3 is a timing diagram illustrating the operation of the time base generator 100 shown in FIG. 2.

FIG. 3 is a timing diagram illustrating a typical relationship of (1) the composite video input signal on one of lines 12, (2) one pulse of the sync signal supplied on line 22 to time base generator 100, (3) the output signal desired on line 103 to flash converter 70, and (4) the fast clock signal FC (typically 32 MHz) supplied to the time base generator. The time base generator 100, in response to the sync signal 22, generates an output signal a desired time t later. As shown in FIG. 3 the desired output signal may occur many fast clock periods following the horizontal sync signal. Importantly, it is extremely unlikely that either the sync pulse input signal 22 or the desired output signal 103 will occur at a fast clock edge. Therefore, the fast clock signal FC, by itself, is insufficient to define the timing of generator 103 with the necessary accuracy to sample pixels reliably.

The time base generator uses the fast clock signal as its clock, but to provide the desired output signal must determine the time $T_1$ by which the horizontal sync signal precedes the fast clock signal, as well as the time delay $T_2$ by which the output signal must lag the last immediately preceding fast clock signal FC. The microcontroller will store data in the pixel select register 110 indicative of the total time t by which the signal is to be delayed. The total time t is the number of fast clock periods between the end of $T_1$ and the beginning of $T_2$, plus $T_1$, plus $T_2$. Because the sum of $T_1$ and $T_2$ will almost certainly include a fraction of a fast clock period, the fast clock signal is not sufficiently accurate to define the timing of the desired output signal.

Conceptually, the time base generator detects the horizontal sync pulse on line 22 and measures the time until the next fast clock pulse N arrives. By subtracting this time ($T_1$) from the total time delay (t) desired, the result will be representative of some number of fast clock periods and a remainder. To supply the desired output signal, the time base generator will count down the specified number of full clock pulses, and following the last clock pulse P will wait an additional time $T_2$, then supply the output edge on line 103. In the preferred embodiment the time base generator measures $T_1$ and defines $T_2$ using a single tapped delay line.

Time Base Generator Circuit

Figure 4:
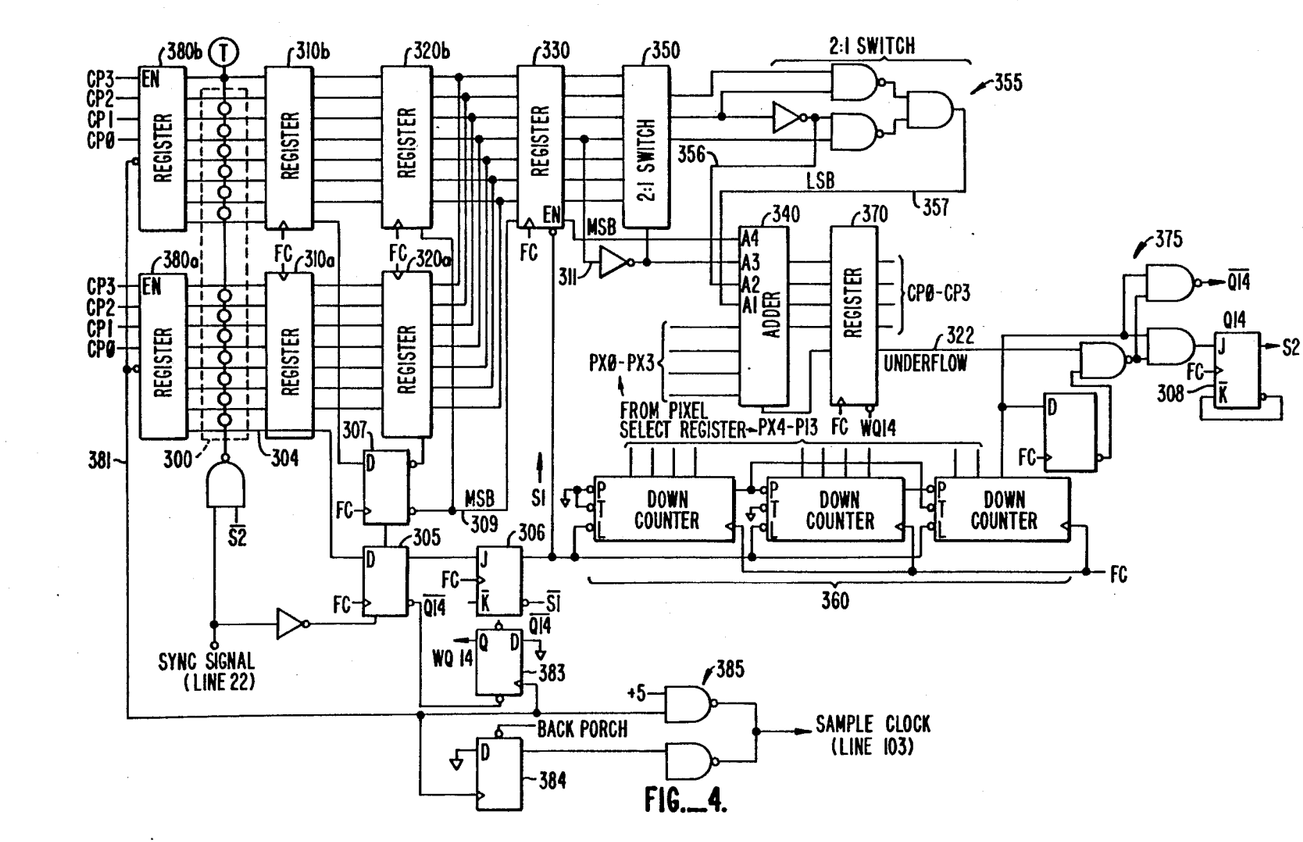
FIG. 4 is a more detailed schematic of the time base generator 100.

FIG. 4 is a detailed schematic of the time base generator 100. The sync signal on line 22 from sync separator 20 (see FIG. 2) is supplied to a delay line module 300 containing a tapped delay line. At the same time the fast clock signal FC is supplied to registers 310 (Fairchild Parts No. 74F374). During any clock period in which the sync signal is received, it is immediately transmitted by line 304 through register 310 to flip-flops 305 and 306 to generate a start signal Sl. Once the sync signal is detected, each of the taps in the delay line module 300 is processed to determine the delay $T_1$ which elapses following the sync signal edge until the clock signal FC (typically 32 MHz) is received by registers 310. The contents of the registers 310 will be determined by the location of the edge along the delay line within module 300 at the time the fast clock pulse FC is received by registers 310.

In the preferred embodiment, between each tap on the delay line, a delay of 1.953125 nsec is provided by a plated trace of appropriate length on the printed circuit board on which the integrated circuits shown in FIG. 4 are mounted. By making the line in a serpentine arrangement, the pins of registers 310 and 380 may connect to the spaced apart taps with short leads. Of course, other types of delay lines may also be employed. During each clock period, the fast clock signal resets each bit in registers 310 to 0. Once the horizontal sync pulse is received, it propagates down the delay line, progressively resetting each bit in the register 310 from 0 to 1. When the next fast clock pulse is received, a "snapshot" is taken of the location of the sync pulse along the delay line in module 300. Each tap which the pulse has passed has resulted in that bit in the register 310 being reset to 1, while all those bits which the pulse has not yet reached remain at 0. Thus, counting upward from line 304 a sequence of bits in register 310 will be reset to 1, and all the following bits will remain at 0. At the time of the next clock pulse, the contents of the register are clocked out to registers 320. The presence of a 1 on line 304 will, via flip-flops 305 and 306, be transmitted to register 330 which will be disabled. Until this time register 330 has been repeatedly loading zeros indicative of the contents of registers 310 and the absence of the horizontal sync pulse. At the time of the sync pulse, the data contained in registers 310 is to be saved, and consequently register 330 is disabled to prevent it from being reset to 0 by the next fast clock pulse.

Flip-flop 307 detects whether the sync signal propagated as far as register 310b. If the pulse did not reach register 310b, then flip-flop 307 causes the contents of register 320a to be clocked into register 330. If the pulse did reach the latter half of the delay line and clocked some of the bits in register 310b to ones, then flip-flop 307 causes the contents of register 320b to be latched into register 330. Each of registers 320 is also a 74F374, while register 330 is a 74S377. At the same time it drives registers 320, flip-flop 307 supplies a signal representative of the most significant bit (MSB) of the digital value of the propagation delay of the horizontal sync pulse over line 309 to adder 340.

In a manner similar to the input line to flip-flop 307, the state of line 311 will indicate whether the pulse propagated more than halfway down register 330. This is the next MSB and line 311 supplies that information to adder 340 and to 2:1 switch 350 (74F157). The output of switch 350 is supplied to a gating network 355 which provides a second 2:1 switch. The state of line 357 indicates the least significant bit (LSB), while line 356 carries the third MSB. Thus, terminals A1 to A4 of adder 340 carry the binary data representing $T_1$. Each of the bits has been inverted before being supplied to adder 340 (74F283) to cause the adder 340 to subtract them from delay, specified on lines PX0-PX3.

From the pixel select register, data is supplied on lines PX0-PX13 indicative of the desired delay t between the sync pulse and the sample. This delay determines the horizontal location of the pixel sampled. The data on lines PX0-PX3 represent the desired fraction of a fast clock period, while the data on lines PX4-PX13 represent the integral number of fast clock periods. The integral portion of the desired time delay t is loaded into a down counter 360 comprising three Fairchild 74F169 parts. Any underflow from the subtraction performed by adder 340 is supplied over line 322 to a gate network 375. If an underflow occurred, one clock period is to be subtracted from the integral number of periods loaded by lines PX4-PX13. Network 375, under control of line 322, determines whether to take the down counter signal delayed by one or delayed by two counts—the equivalent of being able to delete one clock cycle from the down count.

The combination of the underflow and the output from the down counter, together with flip-flop 308, is used to create an output signal S2 when the desired number of clock pulses plus the time by which the sync pulse precedes the first clock pulse, in other words, $t - T_2$ (see FIG. 3) has elapsed. S2, in combination with the result of the subtraction on lines CP0-CP3, can be used to create the desired delay. The data on CP0-CP3 are loaded into registers 380a and 380b, and the complement of signal S2 is supplied to the delay line 300. The 4-bits, CP0-CP3, select one of the taps on delay line 300, in effect time delay $T_2$ (see FIG. 3). Signal S2 supplied to the delay line 300 in conjunction with the information loaded into registers 380, will result in an A-to-D conversion output pulse on line 381, a time t after the sync pulse.

The A to D clock signal on line 381 is supplied to flip-flops 383 and 384 in conjunction with signals Q14, back porch, and a signal from flip-flop 305. The resulting output is supplied on line 103 to drive the flash converter. Flip-flops 383 and 384 provide logic to prevent a sync signal supplied on line 22 from being interpreted as a sample clock signal, and likewise prevent signal S2 from being interpreted as a synchronization signal. The output signal from flip-flops 383 and 384 is stepped up by gates 385 to raise the level to a suitable voltage for driving the emitter-coupled logic of converter 70.

Analog Multiplexer

Figure 5:
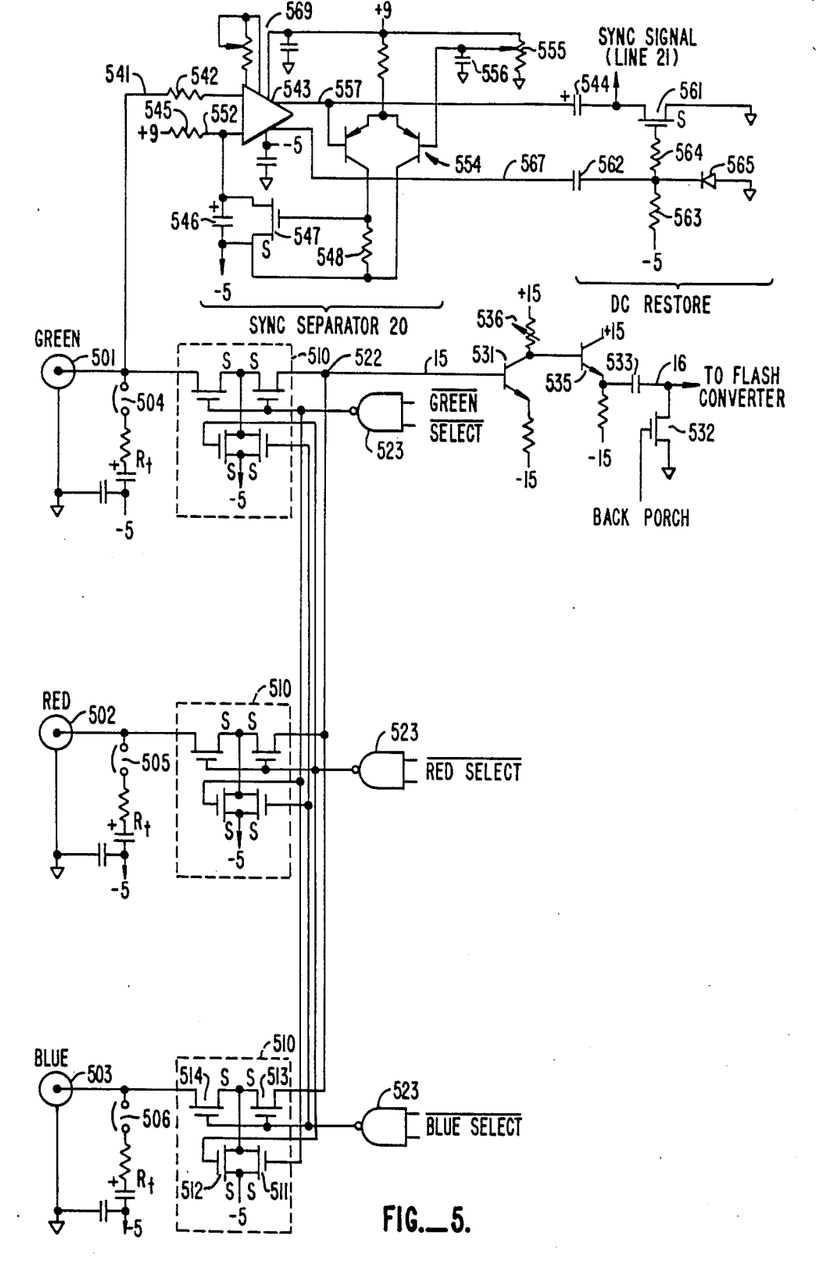
FIG. 5 is a detailed schematic illustrating the analog multiplexer 50 and sync separator 20 of FIG. 2.

FIG. 5 is a detailed schematic of the analog multiplexer 50 and synchronization separator 20 shown in block form in FIG. 2. The green 501, red 502 and blue 503 input terminals are shown along the left-hand side of the figure. Optional jumpers 504, 505 and 506 allow connection of a termination resistance $R_t$ to a desired one of the video input terminals.

A switch 510 is provided between each input terminal and the flash converter to enable selective connection, in response to red, green or blue select signals from the microcontroller of the video on that terminal to the flash converter. Each switch 510 includes four power FET devices 511-514. The four FETs function, in effect, as a single FET, but overcome the problem of feed-through when a single FET is used. Each switch 510 includes two FETs 513 and 514 serially connected, having sources which may be coupled to ground whenever the switch is off.

The three switches 510 are interconnected so that turning on any single channel will turn off the other two channels. For example, by turning on the blue channel, FETs 513 and 514 are made conductive to couple node 503 to node 522. At the same time FETs 511 and 512 in the switches on the green and red channels will be turned on to turn both those channels off. In the preferred embodiment a channel is selected for a time sufficient to digitize a vertical column of pixels, and then the next channel is selected. The TTL to high level interface gates 523 step the select signal potential up from TTL levels to drive the power FETs.

The signal on line 522 is supplied to the base of transistor 531 (2N2369) for the purpose of adjusting the gain and inverting the signal. The collector of transistor 531 provides an inverted signal, while potentiometer 536 allows gain adjustment. Transistor 535 provides an emitter follower to lower the impedance presented to the clamping circuit. The clamping is accomplished by transistor 532 and capacitor 533. The back porch signal is used to drive transistor 532, in effect, providing timing information.

Sync Separator

At the top of FIG. 5, the high speed sync separator 20 and DC restore circuit are shown. The DC restore circuit depicted functions to restore the level of the synchronization signal, in contrast with the DC restoration performed by transistor 532 which functions on the video signal. The sync separator is coupled to the green video because the RS343 specification provides that the synchronization signal will be included with the green video. In the preferred embodiment the sync separator accepts a video input signal on the order of 1.0 volt (sync on the order of 0.3 volts) and supplies a synchronization signal on the order of 4 volts.

The video signal on line 541 passes through a 100-ohm protection resistor 542 and a video amplifier 543, a type 592 amplifier. The sync pulse then passes through a 2.2 microfarad capacitor 544, and is supplied to other circuitry on line 21 as depicted in FIG. 2. Because the synchronization signal passes through so few components, it is delayed only a few nanoseconds, providing a substantial advantage over prior art synchronization separators. Amplifier 543 amplifies the entire video signal to a level at which the synchronization pulses are sufficient to drive downstream TTL circuitry. At the same time the remainder of the circuitry surrounding separator 20 moves the DC operating point to cause the amplifier to limit the video portion of the input signal. Thus, when the input signal is positive for the video, the amplifier is over-ranged, and no output is provided. When the input signal drops back to the level of the synchronization pulse or the back porch level, an output signal is provided.

Amplifier 543 will amplify the difference between the signal received on line 541 and that received on line 552. Line 552 would normally trend upward because of the current flowing through resistor 545. When turned on across capacitor 546, FET 547 pulls the potential of line 552 back down to enable extracting the sync pulse. A differential pair 554 function as a low gain comparator to control transistor 547. This sets the sync pulse tips at the proper amplitude as set by potentiometer 555. A 1,000 ohm resistor is connected across the pair 554. The sink separator detects the most negative level of the sync pulses and servos that value to make it equal to the level set by potentiometer 555. By adjusting this potentiometer 555 the operating range of the amplifier is controlled to the negative going sync pulse does not underrange the amplifier. Potentiometer 569 controls the AC amplitude of the sync output to maintain the total sync pulse within the range of the amplifier. When the amplifier 543 amplifies the difference between lines 552 and 541, only the synchronization signal is amplified, while the video signal is over-ranged.

The amplifier output signal on line 557 will have the appropriate amplitude but will not be located at the proper level. A DC restore circuit comprising transistors 561 and capacitor 562, 100k ohm resistor 563 and 510 ohm resistor 564, together with diode 565, restores the sync signal to the proper level such that the horizontal sync signal is 0 volts and its complement is 4 volts. Resistor 564 unloads the amplifier output from the capacitance of transistor 561.

The signal on line 567 is opposite polarity to the signal on line 557 so that when the signal on line 557 is falling, the signal on line 567 is rising. When the signal on line 567 rises, it turns on a clamping field effect transistor 561, in effect providing positive feedback.

System Firmware

Figure 6:
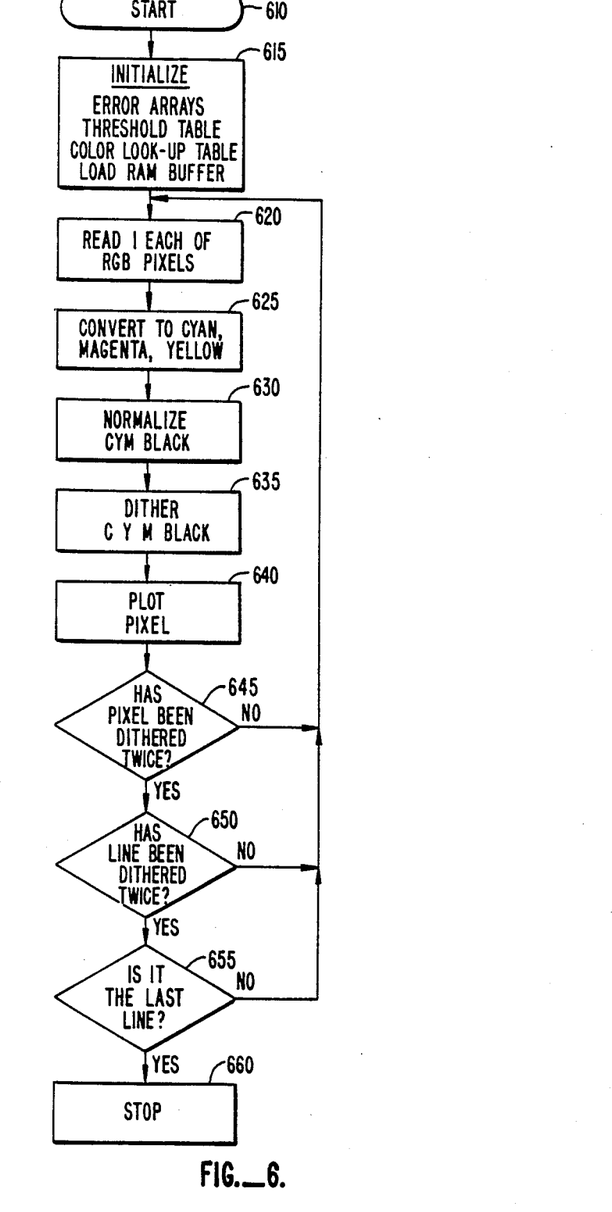
FIG. 6 is a flowchart illustrating the overall processes performed by the system firmware.

FIG. 6 is a flowchart which illustrates the manner by which the digitized image, or portion thereof, stored in random access memory 180 (see FIG. 2) is further processed by microcontroller 150 before being supplied to interface register 210 to drive the plotter. Microcontroller 150 is caused to carry out the processes represented by FIG. 6 by virtue of the stored program within PROM(s) 140.

Broadly speaking, the firmware converts the red, blue, and green image from a graphics display terminal to a cyan, magenta, and yellow system. Black is then introduced and the results of the conversion are normalized to account for the presence of four colors in the output value as opposed to only three in the input value. Next, a digital form of half-toning (often referred to as dithering) is performed on each color channel to improve image quality and produce an image suitable for direct reproduction by a bilevel color display device. By dithering each pixel twice, and then dithering each line twice, a 2×2 expansion of the original signal pixel occurs to enable smoother color transitions and better defined images. The process is repeated line by line throughout the entire picture until the image is complete.

Turning to the preferred implementation of the firmware shown in FIG. 6, the process begins at step 610 at which point the system is activated. Once the system is active, initialization steps 615 are performed to prepare the system for the first image. An error table, a threshold table, and color look-up tables are each created and stored in system memory, and the first RGB color line is loaded into the random access memory buffers. (The functions of the tables are discussed below.) During the initialization a desired number of switch registers 190 will be polled to provide system configuration information. Switch registers may be provided to define the pixel width in very fine increments on the order of 2 nsec, the screen width, the screen height, screen top margin, screen left margin, and whether saturated blacks are to be employed, as well as other features.

Next, one each of three digitized 8-bit RGB pixels is read in as shown at step 620. The three 8-bit digital words, reflecting an analog signal level of between 0 and 255, are indicative of the intensity of each of the red, blue and green pixels in a single location on the screen. Of course, a well known frame store operation could be performed to store the digital values of all pixels on the screen in one large random access memory. If manufacture of the system at lower costs is desired, then only line storage is provided. In the preferred embodiment, the system acquires data vertically from the image on the screen and processing is performed in a pixel-by-pixel manner. This provides adequate speed to drive presently available commercial plotters.

As shown by step 625, the digital information regarding the intensity of the RGB pixels is next converted to a cyan, magenta, and yellow color system using the color look-up tables created during initialization. At the same time, the intensities of the CMY colors may be corrected (commonly known as gamma correction) to allow for the intensity levels and lesser range of the plotter employed compared to the range of the CRT. This process converts the pixels from the additive RGB system to the subtractive CMY system.

At step 630 black is introduced into the color system. The intensity of black will be equal to the intensity of whichever one of cyan, magenta, or yellow has the least intensity. Thus, the introduction of black will reduce the intensity of one of CMY to zero, if it is not already zero, and will also reduce the intensity of the remaining two of CMY. Of course, if one of CMY is already zero intensity, no black is introduced. Although black is not necessary, that is, the conversion could be strictly to CMY, black is included as it provides more flexibility than a three-color system. (Most prior art digital printing systems do not employ black.) In the CMY subtractive color space, a certain amount of the energy in the channels is equal to black energy. Thus, a certain amount of the CMY energy cancels out and, absent the use of black, results in a murky brown tone. To avoid this, black is used.

Introduction of black in this manner, however, results in it being double counted so additional intensity is introduced into the remaining two colors to compensate. In the preferred embodiment, the extra intensity placed into the remaining colors is equivalent to the probability of the plotter placing one of the cyan, magenta or yellow dots directly on top of a black dot. If this occurs, the color dot will "count" for nearly no color as it will be overshadowed by the black. Thus, the remaining colors are compensated.

Once the colors are normalized, a dithering operation, including half-toning, is performed, as illustrated by step 635. At this point the four colors (CMY Black) have been separated and the dithering operation is performed in parallel on each of the four channels separately. Because at each location on the surface of the sheet to be printed, the firmware must determine whether or not to place a dot of given color, an error will almost certainly occur at each location between the color desired and the color the plotter is capable of reproducing. For example, the desired color might be 48% yellow, yet the plotter offers only 0% or 100% yellow. (In general, the plotter is capable of reproducing only cyan, yellow, magenta, black, white and combinations of any two of cyan, yellow and magenta.) Thus, for a given dot an error between the actual and the desired color will occur.

At each location for each channel, the determination of whether to place a colored dot is made to minimize the error between the desired color value and the color the plotter is capable of printing. The system minimizes the error, but saves the error for propagation to surrounding pixel locations. In the preferred embodiment, assuming left-to-right, top-to-bottom scanning, one-quarter of the error per channel is transmitted to the pixel to the immediate right (east) of the pixel being plotted, one-quarter of the error is transmitted to the pixel to the lower left (southwest) of the pixel being plotted, and the remaining half of the error value is transmitted to the pixel directly beneath (south) the pixel being plotted. Of course, other error propagation techniques may be employed. The choice of quarters and halves simplifies binary arithmetic, while the choice of directions of propagation of eliminates any need for recursive processing. Because there are no error values to be propagated from outside the boundary of the image, random values are employed to initialize the error terms, then propagated into the edges of the image.

The choice for each channel of whether to put down a color dot is determined by the relationship of the threshold table to the pixel value resulting from the conversion 625, normalization 630, and the error value carried to that pixel from surrounding pixels. In the preferred embodiment the errors propagated to a pixel originate from pixels to the north, northeast and west of a particular pixel.

In the preferred embodiment of the firmware, a desired amount of randomness is introduced into the threshold to prevent the occurrence of repetitive patterns, yet to avoid degrading the image. For example, assume a dot represents zero intensity and no dot represents full intensity (white paper showing through), and the threshold table for a particular location specifies that a pixel value of under 143 indicates application of a dot, and a threshold value of over 144, no application of a dot. In these circumstances, a desired value of 136 will result in a dot (an energy value of 0). The error of 136 (the dot would have been printed if 0 were desired) will be propagated—34 to the pixel to the right, 68 to the pixel below, and 34 to the pixel to the lower left. In the preferred embodiment a given threshold will be employed for a 2×2 area of dots, then changed to a different value for the next 2×2 area. The 2×2 areas in subsequent scan lines are staggered from those in the preceding and the following scan lines. This feature provides a significant advantage over prior art systems, particularly in constant color areas such as found in synthetic images, by preventing repetitive distractive patterns. The random variations in threshold, coupled with the error propagation technique, result in substantially improved images over the prior art in hard copy, color high resolution video, as a comparison of FIGS. 7 and 8 clearly illustrates.

Once the dithering 635 has been completed, the pixel is plotted (or not plotted) by the plotter as shown by step 640. At this point a single red, blue, and green pixel has been digitized and plotted as a single dot by the printer. In one embodiment, blacker blacks are formed by turning black and all colors on when a black dot is desired. In other embodiments, for example where the inks are more susceptible to running on the paper, only black ink will be used. This feature is controlled by the saturated black switch.

We have found, however, that by expanding the original image, overall improved image quality may be achieved. The expanded image allows smoother roll-off between colors, allows the introduction of random threshold variations to break up repetitive patterns in constant color areas, as well as providing other advantages. To achieve the expansion of a single pixel into a 2×2 array, each pixel is dithered twice as shown by step 645. Then, as shown by step 650 each line of the image is dithered twice, thereby resulting in a 2×2 expansion from a single red, green, blue pixel. Once the last line has been dithered twice, the image is completed and the process stopped.

Although the foregoing has been a description of an exemplary embodiment of an image processing system, it should be understood that the system has been described in its preferred form. The scope of the invention may be ascertained from the appended claims.

I claim:

1. A circuit for separating synchronization signals from a composite video signal and supplying them to a synchronization signal output terminal, the circuit comprising:

an amplifier having first and second input terminals and a first output terminal, the first input terminal being connected to receive the composite video signal, and the first output terminal being coupled to supply the synchronization pulses to the synchronization signal output terminal;

a first potential source coupled, through a current limiting means, to the second input terminal;

a differential pair of transistors having commonly connected first electrodes, including a first transistor haivng a second electrode connected to the first output terminal and a second transistor having a second electrode coupled to a second potential source; and means for reducing the potential of the second input terminal; said means being connected to the differential pair and responsive to control signals from a third electrode of each of the differential pair.

2. A circuit as in claim 1 wherein the means for reducing the potential of the second input terminal comprises:

a third potential source of lower potential than the first potential source; and switching means having a first electrode connected to the second input terminal of the amplifier, a second electrode connected to third potential source and to the third electrode of the second transistor, and a third electrode connected to the third electrode of the first transistor.

3. A circuit as in claim 2 wherein the switching means comprises a third transistor and the third electrode comprises a control electrode.

4. A circuit as in claim 3 wherein the third transistor comprises a field effect transistor and the second electrode of the third transistor comprised the source.

5. A circuit as in claim 3 further comprising a second capacitor coupled between the first electrode and the second electrode of the third transistor.

6. A circuit as in claim 1 wherein each of the first and second transistors comprise bipolar transistors.

7. A circuit as in claim 6 wherein the first electrode of each of the first and second transistors comprises the emitter.

8. A circuit as in claim 7 wherein the second electrode of each of the first and second transistors comprises the base.

9. A circuit as in claim 8 wherein the third electrode of each of the first and second transistors comprises a collector and a resistor is connected between the collectors of the first and second transistors.

10. A circuit as in claim 1 further comprising a first capacitor connected between the first output terminal of the amplifier and the synchronization signal output terminal.

11. A circuit as in claim 1 further comprising means for setting the synchronization signals to a desired potential, the means for setting being coupled to the first output terminal of the amplifier.

12. A circuit as in claim 11 wherein the means for setting comprises:

a fourth potential source;

a fifth potential source of higher potential than the fourth potential source; and a fourth transistor having a first electrode coupled to the first output terminal of the amplifier, a second electrode coupled to the fifth potential source, and a third electrode coupled to the fourth potential source.

13. A circuit as in claim 12 wherein the second output terminal of the amplifier is coupled to the third electrode of the fourth transistor.

14. A circuit as in claim 13 wherein the fourth transistor comprises a field effect transistor and the third electrode comprises a gate.

15. A circuit as in claim 14 further comprising a serially connected third capacitor and first resistor connected between a second output terminal of the amplifier and the third electrode of the fourth transistor.

16. A circuit as in claim 15 wherein the third and fourth potential sources are the same potential, and the fifth potential source is at ground potential.

17. A circuit as in claim 1 wherein the current limiting means comprises a second resistor.

18. A circuit for separating synchronization signals from a composite video signal and supplying them to a synchronization signal output terminal, the circuit comprising:

an amplifier having first and second input terminals and a first output terminal, the first input terminal being connected to receive the composite video signal, and the first output terminal being capacitively coupled to the synchronization signal output terminal to supply the synchronization pulses;

a first potential source connected, through a resistor, to the second input terminal;

a differential pair of bipolar transistors having commonly connected emmitter electrodes, including a first transistor having a base electrode connected to the first output terminal and a second transistor having a base coupled to a second potential source;

switching means for selectively coupling the second input terminal to a second potential source having a potential lower than the potential of the first potential source, said switching means being connected to the differential pair and responsive to control signals from a collector electrode of each of the differential pair; and restoration means, connected to the synchronization signal output terminal, for restoring the synchronization signals to a desired potential.

19. A circuit as in claim 18 further comprising a potentiometer connected between the base of the second transistor and the second potential source.

* * * * *